United States Patent [19]

Kuwayama et al.

[11] Patent Number: 4,839,041
[45] Date of Patent: Jun. 13, 1989

[54] MAGNETIC OIL STRAINER

[75] Inventors: Yoshinari Kuwayama, Tokoname; Fumitomo Yokoyama, Anjo; Koujiro Kuramochi; Tatsuo Kyushima, both of Okazaki, all of Japan

[73] Assignees: Aisin-Warner Kabushiki Kaisha, Anjo; Toyota Jidosha Kabushiki Kaisha, Toyota, both of Japan

[21] Appl. No.: 207,933

[22] Filed: Jun. 17, 1988

Related U.S. Application Data

[63] Continuation of Ser. No. 895,434, Aug. 11, 1986, abandoned.

[30] Foreign Application Priority Data

Aug. 14, 1985 [JP] Japan .................... 60-179106

[51] Int. Cl.⁴ .............................................. B01D 35/06
[52] U.S. Cl. ................... 210/168; 123/196 A; 184/6.25; 210/223; 210/452
[58] Field of Search ............... 210/168, 222, 223, 445, 210/695, 435; 123/196 A; 209/223.1, 223.2, 224, 232; 184/1.5, 6.25, 6.24

[56] References Cited

U.S. PATENT DOCUMENTS

| | | | |
|---|---|---|---|
| 3,784,011 | 1/1974 | Ward | 210/223 X |
| 3,890,232 | 6/1975 | Combest | 210/223 X |
| 4,067,810 | 1/1978 | Sullivan | 210/223 |
| 4,746,427 | 5/1988 | Fukuda et al. | 210/223 |

FOREIGN PATENT DOCUMENTS 59-39317  3/1984  Japan .

Primary Examiner—W. Gary Jones
Attorney, Agent, or Firm—Wegner & Bretschneider

[57] ABSTRACT

A strainer is mounted in an oil passage within a valve body constituting the hydraulic control unit of an automatic transmission. The strainer includes a frame (4) fitted into the oil passage, a reticulate member (5) secured to the frame (4) so as to form a barrier across the oil passage, and a permanent magnet (8) secured by press-fitting or by bonding to frame at a position ahead of the reticulate member (5) in terms of the direction of working oil flow. Foreign matter contained in the working oil is removed by the reticulate member (5) while extremely small contaminants exhibiting a magnetic property, such as ferrous chips, that cannot be removed by the reticulate member (5) are removed by the magnet (8).

4 Claims, 3 Drawing Sheets

MAGNETIC OIL STRAINER

This application is a continuation of U.S. application Ser. No. 895,434 filed Aug. 11, 1986, now abandoned.

BACKGROUND OF THE INVENTION

This invention relates to a strainer mounted on a hydraulic control unit for an automatic transmission. More particularly, the invention relates to a strainer used upon being mounted in an oil passage of a valve body or casing.

An automatic transmission comprises such components as a torque converter, speed gearing and a hydraulic control unit. When the working oil used in these components becomes contaminated with foreign matter, various hydraulic pressure valves employed in the components develop a valve sticking phenomenon and may become inoperable as a result. This accounts for the majority of the early troubles encountered in automatic transmissions. Various measures in terms of design and manufacture have been taken to remedy this phenomenon since the occurrence of valve sticking adversely affects the image of the vehicle equipped with the transmission. One of these measures which is well-known is to provide a reticulate strainer just ahead of the valve that is likely to stick in the hydraulic control unit. This expedient prevents foreign matter such as chips from flowing past the valve. However, mounting the strainer in the oil passage within the valve body presents problems because of space considerations.

In order to solve the problem of space, a variety of strainers have been proposed in the form of a cylinder or disk for use in the oil passage of a valve body, by way of example. In FIGS. 3 through 7, there is shown an example of a strainer in the form of a cylinder, as disclosed in the specification of Japanese Patent Application Laid-Open (Kokai) No. 59-39317. FIGS. 8 through 11 illustrate an example of a disk-shaped strainer, as disclosed in the specification of Japanese Utility Model Application Laid-Open (Kokai) No. 59-36814.

With reference to FIGS. 3 through 5, the cylindrical strainer, indicated at numeral 31, comprises a frame 32 and a tubular reticulate member 33 fixedly secured thereto. The frame 32 is made of nylon and the tubular reticulate member 33 of tetron. The frame 32 includes an annular portion 35 at one thereof, a disk-shaped portion 36 at the other end thereof, and four circumferentially spaced bar-shaped ribs 37 interconnecting the portions 35, 36. The annular portion 35 has an outer periphery 34 for being fitted into an oil passage. The tubular reticulate member 33 is fixedly imbedded in the frame 32 to completely encircle the ribs 37 and the peripheral interstices therebetween with the exception of the inner side 38 of the annular portion 35 of frame 32. A bar-like projection 39 is formed on the outer surface of the disk-shaped portion 36.

As shown in FIGS. 6 and 7, the strainer 31 is used upon being mounted in a cylindrical space formed in a valve body 40 at the joint 42 between the valve body 40 and a separator plate 41. More specifically, this cylindrical space is formed in a portion of the valve body at which oil passages perpendicularly intersect each other, such as a portion 45 where there is communication between an oil passage groove 43 extending parallel to the joint 42 and an oil passage 44 crossing the joint 42 at right angles. Thus, as shown in FIG. 6, the strainer can be easily mounted at any location where there are a fitting seat portion 46 for receiving the outer periphery of the annular portion of frame 32, and an annulus 47.

The strainer 31 is formed at the joint between the valve body and the separator plate, and use is made of the cylindrical space interconnecting the oil passage groove extending parallel to the joint and the oil passage perpendicular thereto. Acordingly, the strainer 31 can be reduced in size and mounted with ease while providing a large mesh area.

FIGS. 8 and 9 illustrate a strainer 51 in the form of a disk. The strainer 51 comprises a tubular member 52 having a bore 53, and a reticulate member 54 secured within the bore 53. The tubular member 52 consists of tetron and the reticulate member 54 of stainless steel. The tubular member 52 comprises an upper enlarged diameter portion 56 and a lower reduced diameter portion 57 separated from each other by an intermediate step or shoulder 55. A locking pawl 58 is projectingly formed on the outer peripheral part of the reduced diameter portion 57. The end of the large diameter portion 56 of tubular member 52 is formed to include four cut-outs 59 spaced equidistantly in the peripheral direction. Similarly, the end of the reduced diameter portion 57 of tubular member 52 is formed to include four cut-outs 60 spaced equidistantly in the peripheral direction.

The reticulate member 54 is placed so as to cover the mid-portion of the bore 53 of tubular member 52 and has its outer peripheral portion imbedded and secured in the wall of the tubular member 52.

As shown in FIGS. 10 and 11, the strainer 51 is mounted with the shoulder 55 and the locking pawl 58 engaged in an oil passage opening 66 in a separator plate 65 clamped between a valve body 62 and a valve body cover 63. The oil passage opening is of a predetermined diameter sufficient to provide a circulation area for oil required of the reticulate member 54.

Since the strainer 51 is of a reduced axial size and a flow passage is provided by the cut-outs, the strainer 51 can be mounted within a space having a limited axial dimension but at the same time provides a large mesh area.

With the conventional strainer that uses the reticulate member, however, it is difficult to remove all foreign matter, inclusive of contaminants having a very small size. In particular, chips of ferrous material account for a major portion of the contaminants of small size, and needle-like chips of a fairly great length can easily pass through the reticulate member. This means that the strainer by itself is not necessarily sufficient for the purpose of removing the foreign matter contained in the oil. Although it may be contemplated to make use of a permanent magnet in the oil duct to remove magnetic contaminants such as ferrous chips, it is difficult to provide a location for mounting the magnet and the mounting operation is complicated and troublesome.

SUMMARY OF THE INVENTION

An object of the present invention is to provide a strainer having a structure with an improved capability of removing magnetic foreign matter of an extremely small size.

Another object of the present invention is to provide a strainer so adapted that a magnet can be mounted in an oil passage with ease.

A further object of the present invention is to provide a strainer so adapted that a limited mounting space is effectively utilized for mounting a magnet in an oil passage.

According to the present invention, the foregoing objects are attained by providing a strainer mounted in an oil passage within a valve body constituting a hydraulic control unit in an automatic transmission, characterized in that the strainer comprises a frame for being fitted into an oil passage, a reticulate member fixedly secured to the frame, and a permanent magnet secured to the frame at a position ahead of the reticulate member in terms of oil flow direction.

In the above-described strainer fitted with the permanent magnet according to the present invention, the magnet is provided within the strainer to improve the ability of the strainer to remove magnetic ferrous contaminants of extremely small size floating in the working oil within the automatic transmission. In addition, the arrangement is more compact than one in which the magnet is provided separately, and the mounting of the magnet itself is facilitated.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Preferred embodiments of the present invention will now be described with refrence to FIGS. 1 and 2.

Figure 1:
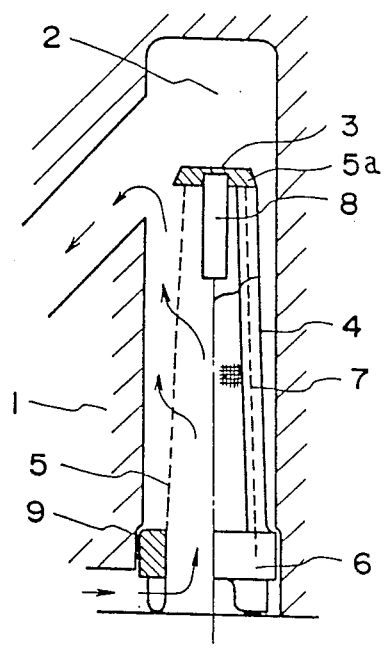
FIG. 1 is a partial sectional view showing a strainer fitted with a permanent magnet according to a preferred embodiment of the present invention.

Referring first to FIG. 1, numeral 1 denotes a valve body, 2 a columnar mounting space, and 3 a strainer in accordance with a first embodiment of the present invention. The strainer 3 includes a frame 4, a reticulate member 5 in the form of a cylinder, and a permanent magnet 8. Numeral 6 denotes an annular portion, 7 denotes bar-shaped ribs and 9 denotes step or shoulder.

The strainer 3 is formed with the cylindrical reticulate member 5 fixedly secured to the frame 4 and is used upon being mounted in the columnar space 2 formed at a portion within the valve body 1 at which oil passages cross each other at right angles. In the present embodiment, the frame 4 is made of nylon and the reticulate member 5 consists of tetron, and the two are molded together into an integrated structure. The frame 4 includes an upper disk-shaped portion 5a, a lower annular portion 6, and four of the bar-shaped ribs 7 interconnecting the disk-shaped portion 5a and annular portion 6. The reticulate member is securely imbedded within the material of the frame 4 so as to cover the space between adjacent ones of the ribs 7. The magnet 8 incorporated within the strainer 3 of the type described is a bar magnet and is secured by press-fitted or by bonding in a recess provided in disk-shaped portion 5a. The magnet 8 can be insert molded at the same time that the frame 4 and reticulate member 5 are molded together. As indicated in FIG. 1, magnet 8 is located along the longitudinal axis of frame 4. To mount the strainer 3 within the oil passage in the valve body or transmission casing 1, the valve body or casing is provided with the shoulder 9 for mating engagement with the annular portion 6 of the strainer 3. It should be noted that the working oil flows as indicated by the arrows. Foreign matter contained in the oil is removed by the reticulate member 5, while very small ferrous contaminants are removed by the magnet 8.

Figure 2:
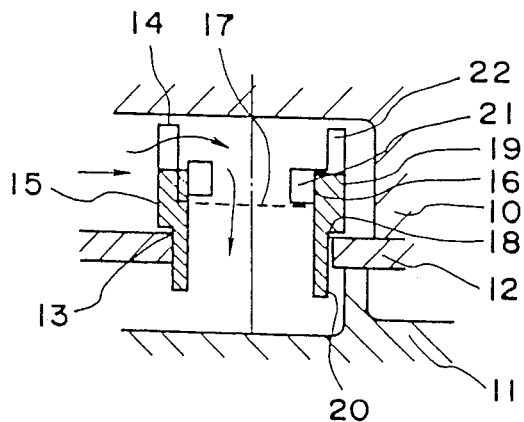
FIG. 2 is a sectional view similar to FIG. 1 and illustrating another embodiment of the invention.
Figure 3:
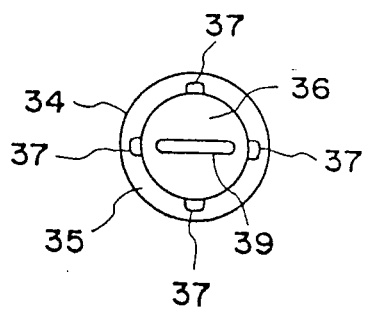
FIG. 3 is a plan view illustrating a cylindrical strainer for being mounted in an oil passage within a valve body.
Figure 4:
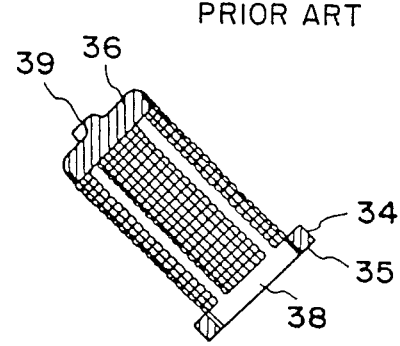
FIG. 4 is a front view, partially cut away, showing the strainer of FIG. 3.
Figure 5:
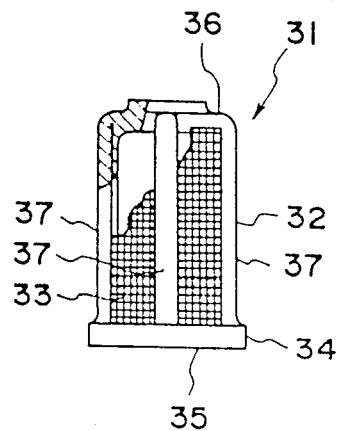
FIG. 5 is a sectional view of the strainer shown in FIG. 3.
Figure 6:
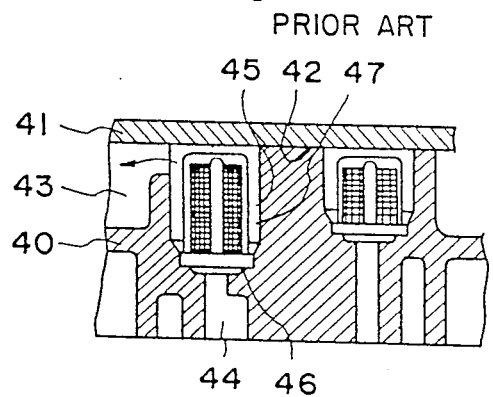
FIG. 6 is a front view showing the strainer of FIG. 3 in the mounted state.
Figure 7:
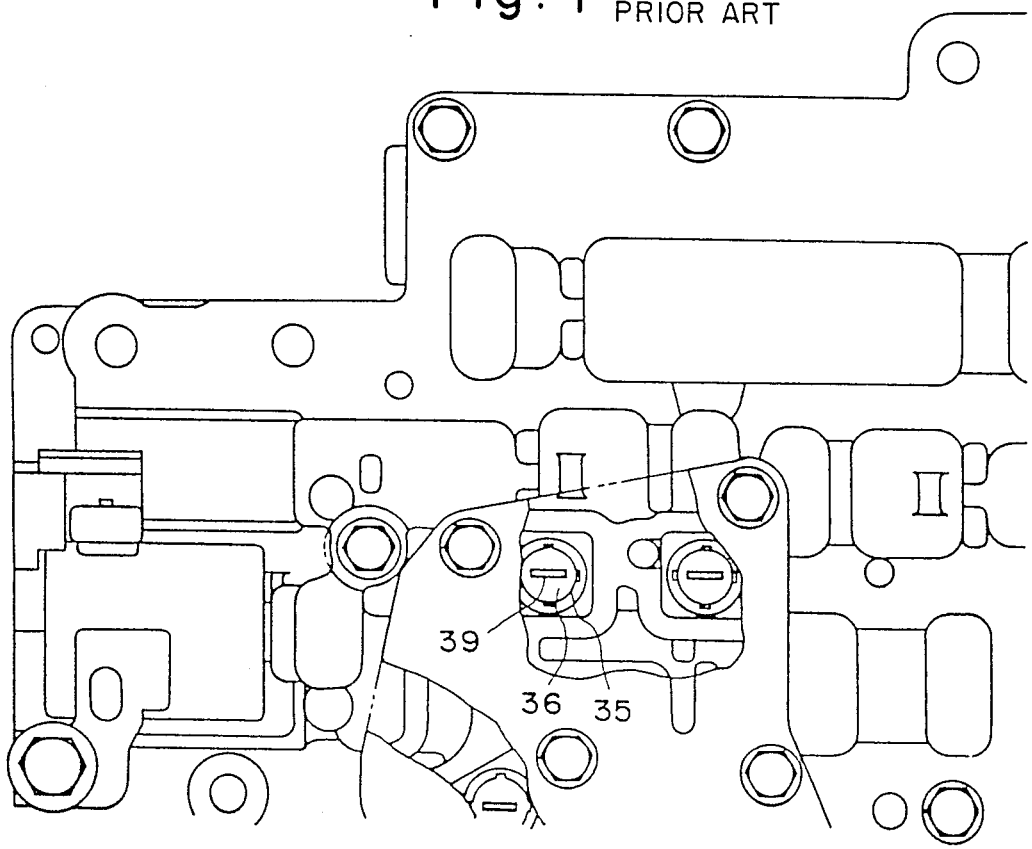
FIG. 7 is a plan view showing the strainer of FIG. 3 in the mounted state.
Figure 8:
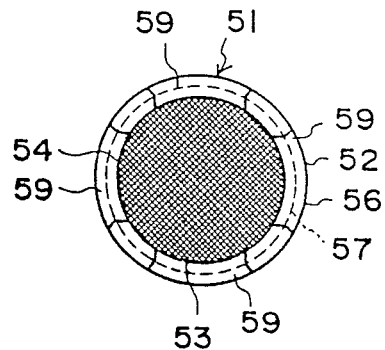
FIG. 8 is a plan view showing a disk-shaped strainer for use in an oil passage within a valve body.
Figure 10:
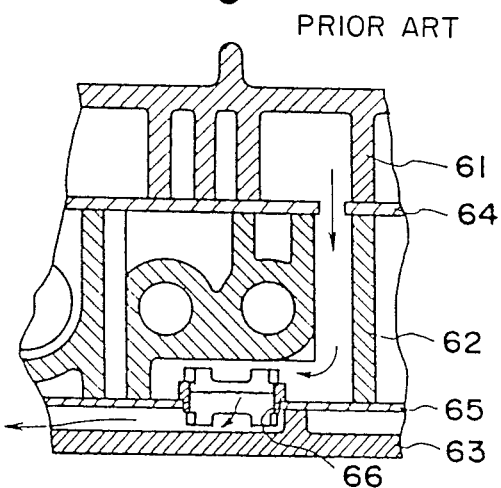
FIG. 10 is a sectional view showing the strainer of FIG. 8 in the mounted state.
Figure 9:
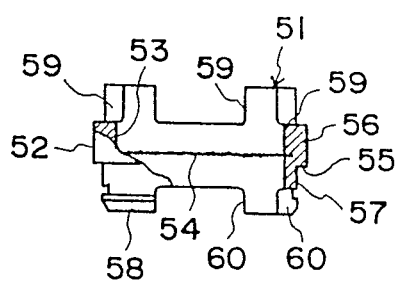
FIG. 9 is a sectional view of the strainer shown in FIG. 8.
Figure 11:
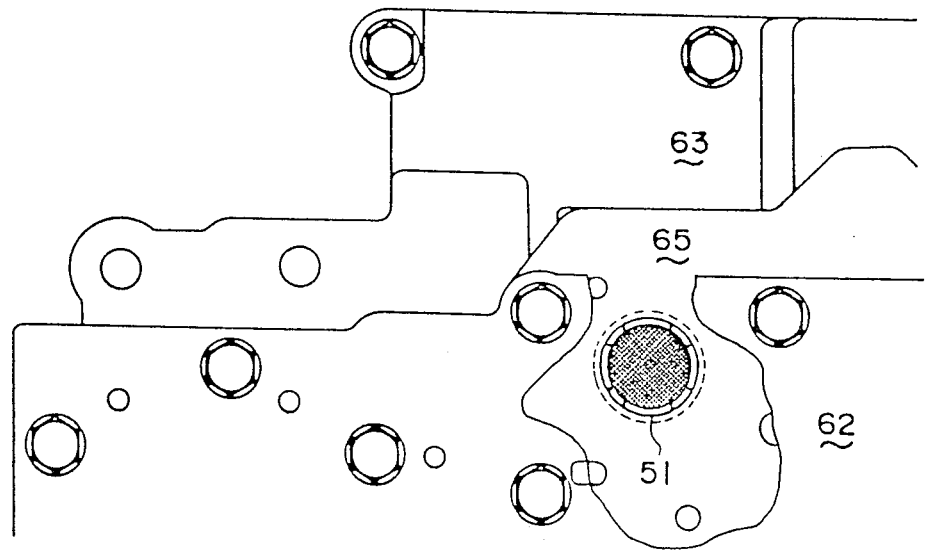
FIG. 11 is a plan view showing the strainer of FIG. 8 in the mounted state.

FIG. 2 shows a strainer 14 in the form of a disk in accordance with a second embodiment of the present invention. The strainer 14 is used upon being mounted in an oil passage opening 13 providing communication between oil passages within valve bodies 10 and 11. The oil passage opening 13 is formed in a separator plate 12, which is clamped between the valve bodies 10 and 11. A reticulate member 17 is secured with a bore 16 of a tubular member 15. In the present embodiment, the tubular member 15 is made of tetron and the reticulate member 17 of stainless steel. The tubular member 15 includes an enlarged diameter portion 19 and a reduced diameter portion 20 separated from each other by an intermediate step or shoulder 18 on the outer peripheral surface of the tubular member. The tubular member 15 is mounted in position with the shoulder 18 engaging the oil passage opening 13 in the separator plate 12. The magnet 21 incorporated within the strainer 14 of this type is annular in shape and is secured within the bore 16 of the tubular member 15 at a position ahead or upstream of the reticulate member 17 in terms of the oil flow. The enlarged diameter portion 19 of tubular member 15 is formed to include four equidistantly spaced cut-outs 22 for the purpose of providing flow passages. With the working oil flowing as indicated by the arrows, foreign matter is removed by the reticulate member 17, while magnetic contaminants such as extremely small ferrous particles are removed by the magnet 21.

The strainer of the present invention is small in size and is adapted to be mounted in the oil passage of a valve body, unlike large strainers for use in main valves. The strainer is used upon being mounted in a flow passage just ahead or upstream of a valve of the type having a comparatively small flow rate, wherein valve movements are frequent and conditions frequently change and the valve is likely to stick due to the presence of very small particles of foreign matter. Typical valves of this type are accumulator control valves, throttle valves and regulator valves.

It may be understood from the foregoing that the present invention provides for removal of foreign matter such as chips by the reticulate member and removal of magnetic foreign matter such as very small ferrous contaminants by the permanent magnet at the same point in an oil passage. In this manner, removal of foreign matter can be achieved locally and in a centralized manner, thereby improving the capability for removing ferrous magnetic contaminants of very small size floating in the working oil of an automatic transmission. Mounting the magnet proper is easier than in an arrangement where the magnet is installed separately, and less space is required.

As many apparently widely different embodiments of the present invention can be made without departing from the spirit and scope thereof, it is to be understood that the invention is not limited to the specific embodiments thereof except as defined in the appended claims.

What we claim is:

1. A strainer mounted in an oil passage within a valve body in an automatic transmission, comprising:
   a frame having a longitudinal axis for being fitted into the oil passage, said frame including an annular portion at one upstream end, a disk-shaped portion at another downstream end, and a plurality of circumferentially spaced bar-shaped ribs interconnecting said annular-shaped portion and said disk-shaped portion;
   a reticulate member fixedly secured to said frame, said reticulate member being secured over interstices between adjacent ribs; and
   a permanent bar magnet secured to said frame upstream from said reticulate member, said magnet being positioned axially so as to act substantially uniformly on the flow of oil through the oil passage.

2. A strainer as claimed in claim 1, wherein said frame is substantially frusto-conical in shape and said magnet is disposed longitudinally within said frame.

3. A strainer mounted in an oil passage within a valve body in an automatic transmission, comprising:
   a frame for being fitted into the oil passage, said frame including a tubular member engaged and retained in an opening of the oil passage, said tubular member having a bore extending substantially longitudinally therethrough;
   a reticulate member fixedly secured to said frame, said reticulate member being secured in an intermediate portion of said bore and extending across said bore to intersect the longitudinal axis of said bore; and
   an annularly-shaped permanent magnet secured to said frame at a position upstream from said reticulate member, said magnet being positioned so as to act substantially uniformly on the flow of oil through the oil passage.

4. A strainer as claimed in claim 3, wherein the inner diameter of said annularly-shaped magnet is less than the diameter of the inlet side of the oil passage, so as to restrict the flow of oil therethrough.

* * * * *